(12) United States Patent
Klinger et al.

(10) Patent No.: US 6,191,860 B1
(45) Date of Patent: Feb. 20, 2001

(54) OPTICAL SHUTTER, SPECTROMETER AND METHOD FOR SPECTRAL ANALYSIS

(75) Inventors: Leonid Klinger, Haifa; Ilya Fine, Rehovot, both of (IL)

(73) Assignee: Orsense Ltd., Rehovet (IL)

( * ) Notice: Under 35 U.S.C. 154(b), the term of this patent shall be extended for 0 days.

(21) Appl. No.: 09/370,131

(22) Filed: Aug. 6, 1999

Related U.S. Application Data

(63) Continuation of application No. PCT/IL98/00059, filed on Feb. 6, 1998.

(51) Int. Cl.[7] ................. G01J 3/51; G01J 3/28
(52) U.S. Cl. ........................... 356/419; 356/330
(58) Field of Search ................. 356/310, 330, 356/419

(56) References Cited

U.S. PATENT DOCUMENTS

| | | | |
|---|---|---|---|
| 4,193,691 | 3/1980 | Fjarlie | 356/330 |
| 5,166,755 | 11/1992 | Gat | 356/419 |
| 5,424,545 | 6/1995 | Block et al. | 250/343 |
| 5,457,530 | 10/1995 | Nagai | 356/330 |
| 5,524,155 | 6/1996 | Weaver | 385/24 |
| 5,553,613 | 9/1996 | Parker | 128/633 |

OTHER PUBLICATIONS

International Search Report for PCT/IL/98/00059 dated May 8, 1998 (2 pages).

*Primary Examiner*—F. L. Evans
(74) *Attorney, Agent, or Firm*—Fitch, Even, Tabin & Flannery

(57) ABSTRACT

An attenuating optical shutter for high speed spectral analysis of an optical radiation band so as to derive N wavelength-dependent portions thereof. The attenuating optical shutter incorporates an optical shutter body including N shutter segments, each selectably switchable between a first substantially transparent and a second substantially opaque optical state, and a multi-zone attenuator comprising N optical attenuating zones each having a different predetermined wavelength-dependent attenuation characteristic. Each of the shutter segments is optically interconnected with a respective one of the N optical attenuating zones of the multi-zone attenuator thus forming N respective cells of the attenuating optical shutter. Such an attenuating optical shutter finds particular application in a spectrometer. A method for determining the spectral function of a sample using the attenuating optical shutter is also described.

33 Claims, 5 Drawing Sheets

OPTICAL SHUTTER, SPECTROMETER AND METHOD FOR SPECTRAL ANALYSIS

This is a continuation of prior application number PCT/IL98/00059 filed Feb. 6, 1998, and designating the United States of America, which is hereby incorporated herein by reference in its entirety.

FIELD OF THE INVENTION

The present invention relates to an optical shutter suitable for spectrometers, a spectrometer comprising such an optical shutter and to a method for special analysis of light radiation making use of the spectrometer.

BACKGROUND OF THE INVENTION

U.S. Pat. No. 4,193,691 refers to a spectrometer which comprises a slit assembly manufactured in file form of a liquid crystal cell. The electrodes of the cell can be selectively actuated for producing a pattern of so-called "slits" (temporarily transparent portions of the cell) which are arranged in a specific manner. Such a liquid crystal cell with a selectively actuatable pattern of "slits" capable of switching between clear and opaque optical states has acquired the name optical shutter. The spectrometer described in U.S. Pat. No. 4,193,691 comprises means for producing a spectrum of light under analysis, means for directing that spectrum on to the above-described slit assembly (where the slits have configurations appropriate to positions of specific spectral lines of interest in the spectrum), and also comprises detection means for detecting a portion of the spectrum which has passed the slit assembly at a specified time. The detected signal is then transmitted to so-called utilization means, i.e. the means by which the detected signal may be processed.

It should be emphasized that the concept of the above-described device resides in obtaining the spectrum of the light under analysis prior to directing radiation to the slit assembly. In accordance with this concept, the description specifically refers to a prism as the classic means for producing the spectrum. The conventional character of these means is further testified by the fact, that in all embodiments described in the specification the spectrum producing means are positioned before the slit assembly. However, such a configuration where the spectrum producing means precede the optical shutter cannot be considered as being the one the most compact and easy to manufacture.

U.S. Pat. No. 5,457,530 describes a "Spectrometer provided with an optical shutter" which follows the above-mentioned concept of first obtaining a light radiation spectrum and further directing it to an optical shutter array for selectively transmitting therethrough predetermined spectral lines (i.e. wavelength-dependent bands) at specified time intervals for further detecting and processing the intensity of these lines. The main involvement of the spectrometer of U.S. Pat. No. 5,457,530 in comparison with that of U.S. Pat. No. 4,193,691 is that, in the former, the optical shutter array includes a plurality of optical shutter elements arranged in correspondence with the lines in the obtained spectrum and being made of a material (PLZT) characterized by the increased switching speed of the optical state. Another difference is that the spectrum producing means constitutes a diffractor by which an incident light beam is diffracted according to wavelengths.

It is quite natural that methods of spectral analysis realizable by the known spectrometers which comprise optical shutters, are all based on the same approach in that the initial band of optical radiation must first be decomposed into a spectrum comprising a predetermined number of optical portions, each including predetermined wavelengths, which optical portions are then processed for further calculations. The optical shutter in the described methods (and devices) is used for high-speed switching between the mentioned optical portions of the spectrum. Such methods impose high requirements on the accuracy of the described optical equipment which is therefore expensive.

U.S. Pat. No. 5,424,545 describes a method for non-invasive non-spectrophotometric infrared measuement of blood analyte concentrations. The method includes either illuminating a sample with a plurality of radiation beams each covering a distinct portion of the spectrum and partially overlapping one another, or detecting radiation reflected or transmitted by the sample using a plurality of broadband detectors having at least partially overlapping responses. The obtained signals are coded and analyzed by analogy to colorimetry and visual processing and can be converted into concentration measurements. The computational method is based on implementation of the idea of color perception for a quantitative substrate analysis, which renders the method complex and time consuming.

OBJECT OF THE INVENTION

A principal object of the invention is the provision of a new concept of a known spectrometer incorporating an optical shutter, allowing for the development of a variety of compact and inexpensive novel spectrometers and to a new design of the optical shutter per se suitable for them. It is another object of the invention to provide a method of spectral analysis using the inventive device.

SUMMARY OF THE INVENTION

The concept of the present invention differs from that which has been acknowledged in the prior art and lies, briefly, in the recognition of the following fact: in a spectrometer with an optical shutter there is actually no need to obtain a spectrum in its conventional meaning, nor is it necessary to decompose the light radiation just before the optical shutter. Rather all that is required is to switch between a number of radiation portions each being wavelength-dependent in any predetermined way by means of the optical shutter.

Recognition of this idea has led the inventors to the conclusion that the conventional spectrum producing means may be replaced by an inexpensive device such as an attenuator comprising an assembly of attenuating zones having different wavelength-dependent attenuating characteristics, and being associated with switching segments (slits) of the optical shutter. Owing to such an exchange and, in accordance with the above-outlined idea, it becomes insignificant whether such a multi-zone attenuator is placed before or after the optical shutter, or is integrally combined therewith. These findings form a new concept of the invention which allows for various novel designs both of the spectrometer and of the optical shutter per se being suitable for spectral analysis purposes.

Thus in accordance with a broad aspect of the invention, there is provided an attenuating optical shutter for high speed spectral analysis of an optical radiation band so as to derive N wavelength-dependent portions thereof, said attenuating optical shutter incorporating:

an optical shutter body including N shutter segments, each selectably switchable between a first substantially transparent and a second substantially opaque optical state, and a multi-zone attenuator comprising N optical attenuating zones each having a different predetermined wavelength-dependent attenuation characteristic;

wherein each of the shutter segments is optically interconnected with a respective one of the N optical attenuating zones of the multi-zone attenuator thus forming N respective cells of the attenuating optical shutter.

According to the simplest and most illustrative embodiment of the invention, the N segments of the optical shutter are capable of being successively actuated so that at any given moment only one of the N segments is in its transparent state.

It is understood that in such an attenuating shutter, each cell comprises one specific attenuation zone of the multi-zone attenuator optically interconnected to one corresponding segment of the shutter body. Thus, since only one optical segment is transparent at any given moment, only one specific wavelength-dependent portion of the optical band will pass through the attenuating shutter.

Alternatively, each of the N segments of the optical shutter may be switched from the first to the second state and vice versa at a different pre-selected frequency. In such an arrangement each optical radiation portion passing through a particular segment of the optical shutter is modulated at a frequency associated with this particular segment It is known to those skilled in the art that frequency modulation renders a signal noise resistant, and that the higher the modulation frequency, the greater the signal-to-noise ratio.

According to one particular case, each of the optical attenuating zones of the multi-zone attenuator may constitute a bandpass filter which allows passage therethrough of a narrow sub-band of optical radiation having predetermined wavelengths, while rejecting (i.e. absorbing or scattering) radiation of other wavelengths. In this embodiment the multi-zone attenuator functions as an assembly of bandpass filters. However, the optical attenuating zones may have other, more complex wavelength-dependent attenuating characteristics and the only requirement which is to be met for the inventive device is that all the different attenuating zones must have different but known attenuating characteristics for all wavelengths of interest.

The attenuating shutter may comprise the two above-mentioned components (i.e. the multi-segment optical shutter body and the multi-zone attenuator) applied to one another in that a pattern of N segments of the optical shutter body substantially coincides with a pattern of N optical attenuation zones of the multi-zone attenuator. Such an embodiment of the attenuating shutter may be manufactured by arranging the N zones of the multi-zone attenuator and the N segments of the optical shutter in predetermined identical geometrical shapes, applying the multi-zone attenuator on to the optical shutter and affixing (for example, by gluing) one to the other so, that respective zones and segments coincide.

In a slightly different embodiment, mutual positions of the optical shutter body and the multi-zone attenuator are such that each of the N segments of the optical shutter body lie on one and the same optical path with the corresponding optical attenuation zone of the multi-zone attenuator, while being spaced therefrom.

According to another embodiment of the attenuating shutter, the N segments of the optical shutter body may be respectively interconnected to the N respective optical attenuation zones of the multi-zone attenuator by means of at least N optical fibers.

In use, such attenuating shutters, as outlined above, may be irradiated either from the side of the shutter body or from the side of the multi-zone attenuator. In other words, the multi-zone attenuator may either precede the optical shutter along the direction of the optical beam or follow the optical shutter.

Having described the construction of the attenuating shutter, its operation will now be described. In the configuration, where the multi-zone attenuator is positioned before said optical shutter body along the optical beam, the multi-zone attenuator receives the optical radiation band and simultaneously transmits N wavelength-dependent portions thereof on to the appropriate N segments of the optical shutter body, which body controllably transmits therethrough the obtained wavelength-dependent portions. As has been noted, the optical shutter may transmit these portions successively, i.e. one by one through the N segments, respectively. However, each of the optical segments may switch on and off with its own frequency, so that the optical portions produced by the shutter will outgo therefrom substantially simultaneously, being modulated each by its particular frequency.

In another configuration, where the multi-zone attenuator is positioned after the optical shutter, said optical shutter receives the optical radiation band and allows for controllable passing of optical portions thereof trough the N segments of the shutter's body; the optical portions pass either successively or simultaneously (by applying a particular frequency modulation to each of them); the optical portions outgoing from the N segments of the optical shutter pass through the corresponding N wavelength-dependent attenuation zones of the multi-zone attenuator, thus tuning into N wavelength-dependent optical portions of the optical band.

According to yet another option, the attenuating shutter may be manufactured as an integral body constituting the optical shutter combined with the multi-zone attenuator and, where the N segments which are capable of selectively switching between the first and the second optical states, also serve as N optical attenuating zones having different predetermined wavelength-dependent attenuation characteristics.

In any one of the described embodiments the optical shutter body may be manufactured from a ferroelectric liquid crystal, having a high switching speed. Such a liquid crystal cell comprises N zones each having its own predetermined wavelength-dependent attenuating characteristics, which are selectively actuatable in a manner enabling each of the zones to switch between the first (relatively transparent) and the second (relatively opaque) optical states.

It is to be noted, that in the novel attenuating shutter the optical shutter body is used not for switching between positions of optical portions of a preliminarily obtained spectrum (as it is arranged in the prior art), but for controllable passing of the initial radiation through a pre-arranged assembly of attenuating zones of the multi-zone attenuator. Owing to this fact, the attenuating shutter structure according to the invention enables the attenuating zones (and the corresponding segments of the optical shutter body) to be designed according to any desired configuration For example, the novel attenuating shutter will be indispensable in applications where it is impossible to amplify an initial light signal but, to the contrary, there is a need to thoroughly collect this initial light signal from a ready-to-access region. Such a situation is usual for measurements in vivo, especially for those provided in body cavities.

In specific cases, where concentration of a specific substance is to be defined in an optical sample, the optical radiation band may be initially restricted so as to include only characteristic wavelength ranges, and the attenuating shutter may have a restricted number of cells for processing the spectral lines. For example, for determining the hemoglobin or glucose concentration in a biological tissue, the optical radiation band may be chosen to comprise wavelengths in the near infrared range, for example those which may be produced by light emitting diodes (LEDs). The attenuating shutter may therefore comprise only cells active in this specific wavelengths range.

According to a variation of this aspect of the invention, there is provided a spectrometer for spectral analysis of a band of optical radiation, comprising the attenuating shutter according to any of the embodiments described herein before. Preferably, the spectrometer comprises:

an optical detector for receiving said optical radiation and producing all analog signal, an analog-to-digital (A/D) converter coupled to an output of the optical detector for converting the analog signal to an equivalent digital signal, a computing means coupled to the A/D converter for processing the digital signals so as to derive the desired spectral data; and a controller means for controlling activation of said attenuating shutter and for controlling other components of the spectrometer.

The attenuating shutter may be activated, for example, according to any of the two above-described principles (schedules).

More particularly, the N zones of the optical shutter body of the attenuating shutter may be activated successively so that at each specific timing only one zone is in its first (transparent) state. In this case the optical detector of the spectrometer is controlled synchronously for successively detecting light intensities of the N wavelength-dependent portions of the optical radiation outgoing from the attenuating shutter. Similarly, the A/D converter block is adapted for synchronous receiving of electric signals from the optical detector and for transmitting thereof in the digital form to the computer means for processing.

However, the optical shutter body of the attenuating shutter may be is controlled so as to activate each of the N optical zones thereof with a pre-selected frequency, thus applying a pre-selected frequency modulation to the optical radiation portion passing through a particular cell of the attenuating shutter and thereby allowing for simultaneous passage of the N optical radiation portions through said shutter in real time. For this purpose, the spectrometer may be equipped with N drivers having different frequencies for controlling the attenuating shutter, the detector, in turn, may be linked to an electronic circuitry capable of separating the detected integral signal into N constituent signals. In one particular case, the electronic circuitry is designed for deriving N constituent signals from the integral detected signal, according to their carrier frequencies, and converting each of said N constituent signals into digital form for further processing by the computer means.

The main components of the spectrometer may be arranged in the following exemplary and non-limiting configurations.

According to a first configuration of the spectrometer, the attenuating shutter is adapted for receiving the band of optical radiation from a sample to be investigated, the optical detector being arranged to follow the attenuating shutter along the optical beam direction. The detector may be coupled to the attenuating shutter directly or via a collecting lens.

According to a second configuration of the spectrometer, the optical detector is placed after the attenuating shutter along the optical beam direction in such a manner that a sample to be investigated can be positioned between the attenuating shutter and the optical detector; the attenuating shutter being subjected to direct illumination by the band of optical radiation.

It should be noted that the spectrometer may be additionally equipped with a light source.

In the first modification, the light source may be placed before the attenuating shutter, to enable the introduction of the sample to be investigated between the light source and the shutter.

In the second modification the light source may be placed before the attenuating shutter for direct illumination thereof (while the sample to be investigated is accommodated between the attenuating shutter and the detector). Such an embodiment provides for more accurate measurements than placing the object before the attenuating shutter, since it allows for more precise calibration of the attenuating shutter owing to the known optical composition of the initial radiation band.

If the spectrometer is designed for performing measurements on biological objects, the light source may comprise one or more light emitting diodes (LEDs).

However, components in the spectrometer may be arranged in yet a different way. For example, if the spectral analysis is performed for the radiation portion reflected from an object, and not for that transmitted through the object, configuration of the spectrometer must be modified slightly for illuminating samples so as to ensure the collecting of the reflected radiation.

With respect to yet another aspect of the invention, it should be recalled that the known methods of spectral analysis based on optical shutters all involve the following approach:

preliminary production of a spectrum of the optical band under examination by an optical prism or a diffracting grating;

using an optical shutter for high-speed switching between the wave-length-dependent optic portions of the spectrum, successively detecting intensities of said wavelength-dependent optic portions for fiber successive processing of these readings;

calculation of the light intensities inherent in a number of predetermined wavelengths of interest Sam the above-mentioned readings, and determining the light intensities' distribution in the optical band under examination.

A novel method of spectral analysis of an optical radiation band, i.e. a method of defining its spectral function being a distribution of light intensities in respect of wavelengths of interest, involves a reverse approach, and comprises the following steps:

(a) providing the above-described novel attenuating shutter comprising N cells, each having its own preliminarily defined wavelength-dependent attenuation characteristics;

(b) illuminating said attenuating shutter with said optical radiation band;

(c) actuating said attenuating shutter in a controlled manner for obtaining N wavelength-dependent portions of said optical radiation band;

(d) providing N measurements of intensity of the obtained N respective wavelength-dependent portions of said band; and (e) calculating the spectral function of said optical radiation band based on the obtained N measurements of intensity and the preliminarily defined wavelength-dependent attenuation characteristics.

The novel method can also be used for determining spectral function of a sample. For example, in the above-defined method the optical radiation band may constitute radiation acquired from the sample, more particularly, either the radiation transmitted through the sample or the radiation reflected therefrom. In this case, the sample must be illuminated by an initial optical radiation band with a known optical composition, the sample being considered a radiation absorbing and/or scattering optical environment According to an alternative approach, the method of determining spectral function of a sample comprises the following steps:

(a) providing the above-described novel attenuating shutter with N cells and having preliminarily defined wavelength-dependent attenuation characteistics for each of N zones of the multi-zone attenuator, (b) illuminating said attenuating shutter with an optical radiation band having a known optical composition;

(c) actuating said attenuating shutter controllably for obtaining N wavelength-dependent portions of said optical radiation band;

(d) illuminating said sample with said N wavelength-dependent portions of said optical radiation band;

(e) providing N measurements of intensity of N respective optic portions acquired from the sample; and (f) calculating the spectral function of said sample based on the obtained N measurements of intensity and the preliminarily defined wavelength-dependent attenuation characteristics.

It should be appreciated that, for accomplishing the above methods, the "predetermined wavelength-dependent characteristics" for each of N attenuating zones of the attenuating shutter must be preliminarily obtained, such characteristics being a combination of a plurality of specific attenuation coefficients (ratios) actual for the plurality of wavelength of interest, respectively.

In practice, the plurality of wavelength-dependent attenuation ratios for each of the N optical attenuation zones of the attenuation can be obtained experimentally by a manufacturer, during a calibration procedure. Such calibration may constitute an additional preliminary step which is to be preformed before the above method. The calibration may be performed by illuminating the attenuating shutter with a known spectrum of optical radiation through a medium having known optical properties (such as air).

The N attenuation characteristics preliminarily defined either by a manufacturer or by a customer are then used for computerized calculations of the sought-for spectral function according to the inventive method.

The above-described method may be accomplished in a number of versions, depending on a manner of the shutter cells' actuation (either successive or simultaneous with frequency modulation), and a pre-selected mathematical way of determining the spectral function (e.g., calculation of the spectral intensities point-by-point, restoration of the spectrum using methods of approximation, etc).

For example, according to one particular version of the above-defined method, the spectral function is determined in respect of M wavelengths of interest;

said wavelength-dependent attenuation characteristics of each particular cell of the attenuating shutter being composed of M preliminarily defined wavelength-dependent attenuation ratios of the corresponding zone of the multi-zone attenuator, thereby M*N of said ratios are preliminarily defined;

the spectral function of said optical radiation band is calculated based on the obtained N measurements of intensity and the preliminarily defined M*N wavelength-dependent attenuation ratios where M is not greater than N.

Based on the version defined above, the spectral function of the optical band under examination (i.e. its light intensity distribution) may be built based on data of elementary spectral intensity of each specific wavelength of the M predetermined special lines of interest in this band.

According to a particular version of the above method, the spectral function (being the distribution of intensities of the M wavelengths) can be calculated using the following system of equations:

$$\Delta I_1 = \sum_{i=1}^{M} A_i \varphi_1(\lambda_i) \qquad (1)$$

$$\Delta I_j = \sum_{i=1}^{M} A_i \varphi_j(\lambda_i)$$

$$\Delta I_N = \sum_{i=1}^{M} A_i \varphi_N(\lambda_i)$$

where

N—the number of attenuation zones in the attenuating shutter, which may be obtained therefrom;

j—a running number of an attenuating zone in the shutter, $(1 \leq j \leq N)$;

M—the quantity of spectral lines (corresponding to specific wavelengths) which is chosen for spectral analysis, $M \leq N$;

i—a running number of a spectral line $(1 \leq i \leq M)$;

$\lambda_i$—a wavelength corresponding-to a specific spectral line i;

$\Delta I_j$—intensity of one specific wavelength-dependent optic portion detected by the detector and registered in the computer;

$A_i$—intensity of a specific spectral line (in case of examining a sample—a discrete value of its spectral function at a specific spectral line);

$\phi_j(\lambda_i)$—an attenuation ratio of the attenuation zone j in the attenuating shutter regarding the wavelength $\lambda_i$.

In a particular example the ratio $\phi_j(\lambda_i)$ may be represented as follows:

$$\phi_{j,i} = \exp(-\mu_i d_j)$$

where:

$\mu_i$—a coefficient which is inherent in the material of the attenuation zone j and is constant for the wavelength $\lambda_i$;

$d_j$—the thickness of the attenuation zone j.

When rewriting system (1) into N expanded equations, one obtains:

$\Delta I_1 = A_1\phi_1(\lambda_1) + A_2\phi_1(\lambda_2) + \ldots A_i\phi_1(\lambda_i) + \ldots A_M\phi_1(\lambda_M)$
$\Delta I_2 = A_1\phi_2(\lambda_1) + A_2\phi_2(\lambda_2) + \ldots A_i\phi_2(\lambda_i) + \ldots A_M\phi_2(\lambda_M)$
$\Delta I_j = A_1\phi_j(\lambda_1) + A_2\phi_j(\lambda_2) + \ldots A_i\phi_j(\lambda_i) + \ldots A_M\phi_j(\lambda_M)$
$\Delta I_N = A_1\phi_N(\lambda_1) + A_2\phi_N(\lambda_2) + \ldots A_i\phi_N(\lambda_i) + \ldots A_M\phi_N(\lambda_M)$ It is therefore understood that if N intensities $I_1 \ldots I_N$ of N wavelength-dependent optic portions are measured as described above, and M*N values of wavelength-dependent ratios of the shutter $\phi_j(\lambda_i)$ are preliminarily defined and stored in the computer memory, the sought-for M values of intensities $A_i$ of each spectral line of interest can be derived from the above system. A curve of the spectral function intensity/wavelength can then be built "point by point" using the obtained M values.

It is logical, that accuracy of the light intensity spectrum curve that is obtained, as described above, depends on the number of points used for its reconstruction. Since the number of points M (resolution) is defined by the number of optical channels of the attenuating shutter (M≦N), it is obvious that the accuracy of the obtained function depends on the complexity of the device. On one hand, it is apparent that for increasing the accuracy one should maximally increase the number of cells of the attenuating shutter. On the other hand, when the attenuating shutter divides the incoming radiation into a large number of optical portions according to the number of the cells, it inevitably leads to the essential decrease in power of each of the obtained portions and thereby directly affects sensitivity of the device. It should also be pointed out that the attenuating shutter with a large number of cells would bring up, according to the above-described method, a system of equations having the corresponding large complexity. It is known, however, that the higher the complexity of a system of equations, the lower is its stability, i.e. the higher is an expected error of the system's solutions. Moreover, speed of response of the attenuating shutter with a great number of cells will be lower than that of the shutter having a small quantity of cells.

According to yet another version of the above-described method, the spectral function along the fill wavelength spectrum of the optical radiation band under examination can be sufficiently accurately restored without increasing the quantity of cells in the attenuating shutter.

To achieve the purpose, the inventors have suggested to calculate the sought-for spectral function by mathematically approximating thereof by an unknown function, applying a procedure of error minimization and further restoring the spectral function.

With the above approach a relatively simple attenuating shutter may be utilized, which would divide the optical radiation band under examination into a limited number of sufficiently intensive wide band portions, and within a sufficiently short time of response.

Various options for approximation of the sought-for function may be suggested. For example, a polynomial approximation might be selected; the procedure of error minimization chosen might be Gauss' procedure, i.e. the so-called method of "minimal squares". This particular example will be disclosed below in the detailed description of the preferred embodiments.

The above-suggested approach is most suitable for restoring so-called "smooth" functions, such as spectral functions of biological objects.

According to any of the above-described options, the inventive method may be used for defining concentration of a predetermined substance in a sample under examination. In such a case the sample or the attenuating shutter may be irradiated by an electromagnetic radiation band having the wavelength composition being not only known, but initially restricted to wavelengths which are characteristic of the spectral function of said substance.

For example, the above method may be used for invasive or non-invasive determining of the hemoglobin or glucose concentration in blood. The optical composition of the restricted radiation may be chosen from the near infrared range, for example the light produced by LEDs.

BRIEF DESCRIPTION OF TIE DRAWINGS

For better understanding, some specific embodiments of the attenuating shutter and the spectrometer according to the invention will now be described, by way of example only and with reference to the annexed drawings in which.

DETAILED DESCRIPTION OF PREFERRED EMBODIMENTS

Figure 1:
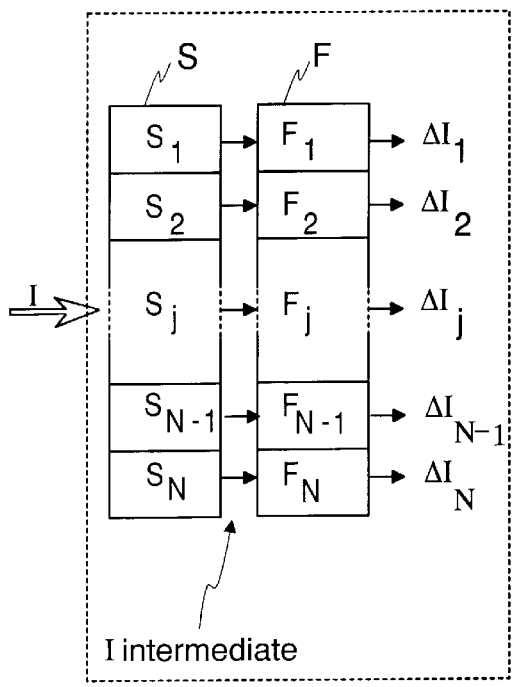
FIG. 1 is a schematic cross-sectional view of one embodiment of the attenuating shutter according to the invention.

FIG. 1 illustrates a novel attenuating shutter 10 according to a first embodiment, comprising a combination of a conventional optical shutter S formed on a liquid crystal body, and a multi-zone attenuator F which, for example, constitutes an array-like filter assembly. The attenuating shutter 10 is suitable for spectral analysis of an optical radiation band, i.e. for use in spectrometers for defining light intensities of a number (for example M) of specific wavelengths of interest. These wavelengths of interest are called spectral lines.

The optical shutter S comprises N segments $S_1, S_2, \ldots S_j \ldots S_N$, each being selectably switchable between a first (essentially transparent) and a second (essentially opaque) optical state.

The multi-zone attenuator F includes N optical attenuating zones (filters) $F_1, F_2, \ldots F_j \ldots F_N$, each being characterized by its wavelength-dependent characteristics, i.e. by a plurality M of light attenuation ratios $\phi_j(\lambda_i)$ inherent in the material of the segment and constant for each wavelength $\lambda_i$ from the mentioned M values of the wavelengths of interest As seen in FIG. 1, the optical shutter S precedes the multi-zone attenuator F along the direction of the light beam, and each segment $S_j$ is optically interconnected to a corresponding attenuating zone $F_j$. According to this embodiment, an optical radiation band having intensity I enters the body of the optical shutter S and is successively passed through each of its segments $S_j$ one at a time, so that the attention array F successively receives one optical portion $I_{INTERMEDIATE}$ of the band which, however, has the same spectral composition as the initial band. When the optical portion $I_{INTERMEDIATE}$ enters a particular attenuation zone $F_j$, it is transferred in this zone to a particular wavelength-dependent optical portion having intensity $\Delta I_j$. Owing to such an arrangement, the attenuating shutter 10, upon receiving at its inlet an optical band having intensity I, produces at its outlet N successive wavelength-dependent optical portions having intensities $\Delta I_1, \Delta I_2, \ldots \Delta I_j \ldots \Delta I_N$.

Figure 2:
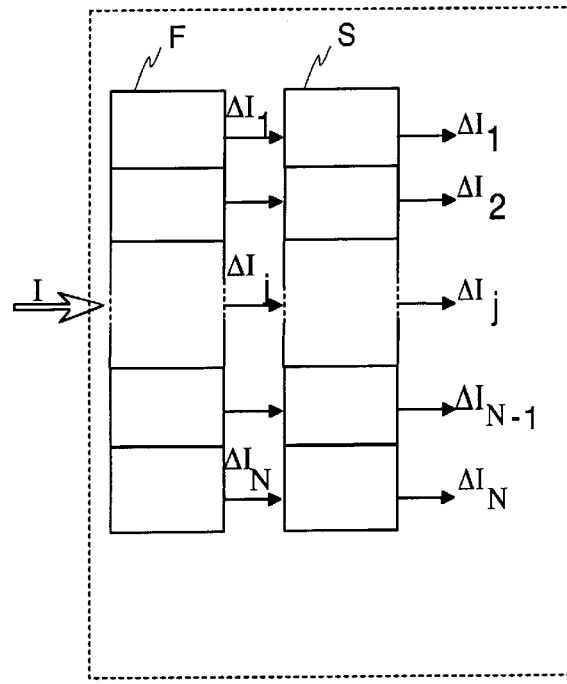
FIG. 2 is a schematic cross-sectional view of another embodiment of the attenuating shutter according to the invention.

FIG. 2 illustrates an attenuating shutter 20 according to an alternative embodiment which has identical components to the attenuating shutter 10 shown in FIG. 1 but arranged differently. Thus, in the configuration shown in FIG. 2 the shutter S follows the multi-zone attenuator F along the direction of the optical beam. The incoming optical band having intensity I is simultaneously attenuated by each of N attenuation zones of the attenuator F so that all these zones $F_1$ to $F_N$ produce simultaneously N wavelength-dependent optical portions having light intensities from $\Delta I_1$ to $\Delta I_N$, respectively The optical shutter S successively transmits through its body the obtained wavelength-dependent optical portions by means of successive actuation of the segments $F_1$ to $F_N$, each of which receives only a particular optical portion from a corresponding attenuating zone of the multi-zone is attenuator F. As is seen, the result obtained at the outlet of the attenuating shutter 20 is identical to that obtained from the shutter 10.

Figure 3:
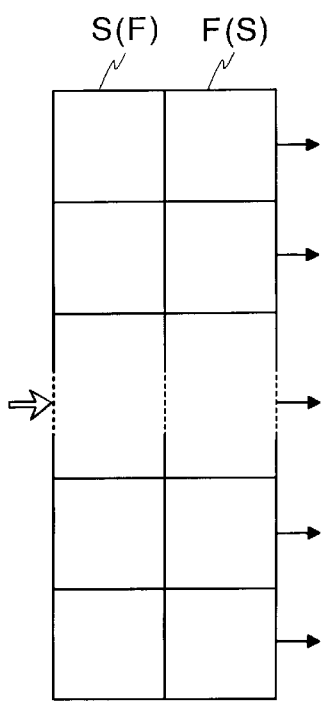
FIGS. 3 and 4 are schematic cross-sectional views of embodiments which may be designed based on the attenuating shutter shown either in FIG. 1, or in FIG. 2.

FIG. 3 illustrates a mode of optical interconnection which may be established between the shutter S and the multi-zone attenuator F. Contrary to the configurations shown in FIG. 1 and in FIG. 2, where the shutter and the attenuator are spaced from one another, FIG.3 illustrates an arrangement where the shutter S and the attenuator F are tight-fitting or even glued to one another. The order of the components S and F along the direction of the optic beam is irrelevant.

Figure 4:
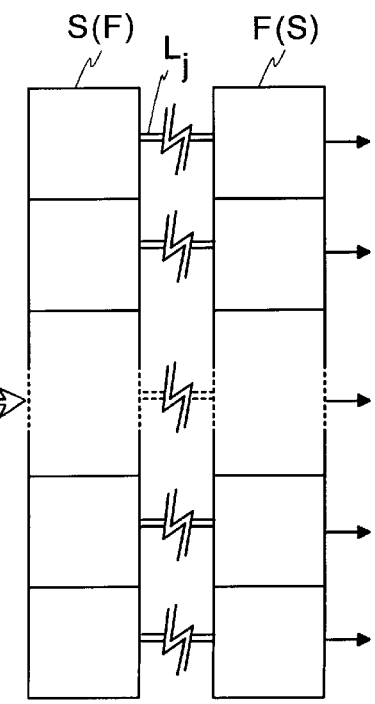

FIG. 4 shows another way of providing optical connection between the shutter S and the attenuator F. It can be seen that the components are interconnected by optical fibers, so tHat each segment $S_j$ of the optical shutter S is coupled to a corresponding attending zone $F_j$ of the attenuator F by at least one optic fiber $L_j$.

Figure 5:
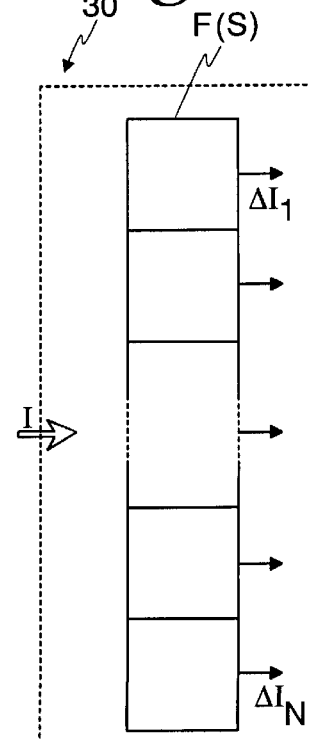
FIG. 5 is a schematic cross-sectional view of yet another embodiment of the attenuating shutter where the optical shutter body integrally incorporates a multi-zone attenuator.

FIG. 5 is a generalized illustration of a third embodiment 30 of the attenuating shutter F/S consulting the optical shutter and the multi-zone attenuator integrally combined with one another in one body, such as a liquid crystal body. The optical shutter 30 may constitute, for example, a liquid crystal cell comprising N zones, which are selectively actuatable in a manner enabling each zone to switch between the first (relatively transparent) and the second (substantially opaque) optical state; however, each of these zones in its relatively transparent state has its own predetermined wavelength-dependent attenuating characteristics (i.e. will differently attenuate light radiation of different wavelengths).

Figure 6:
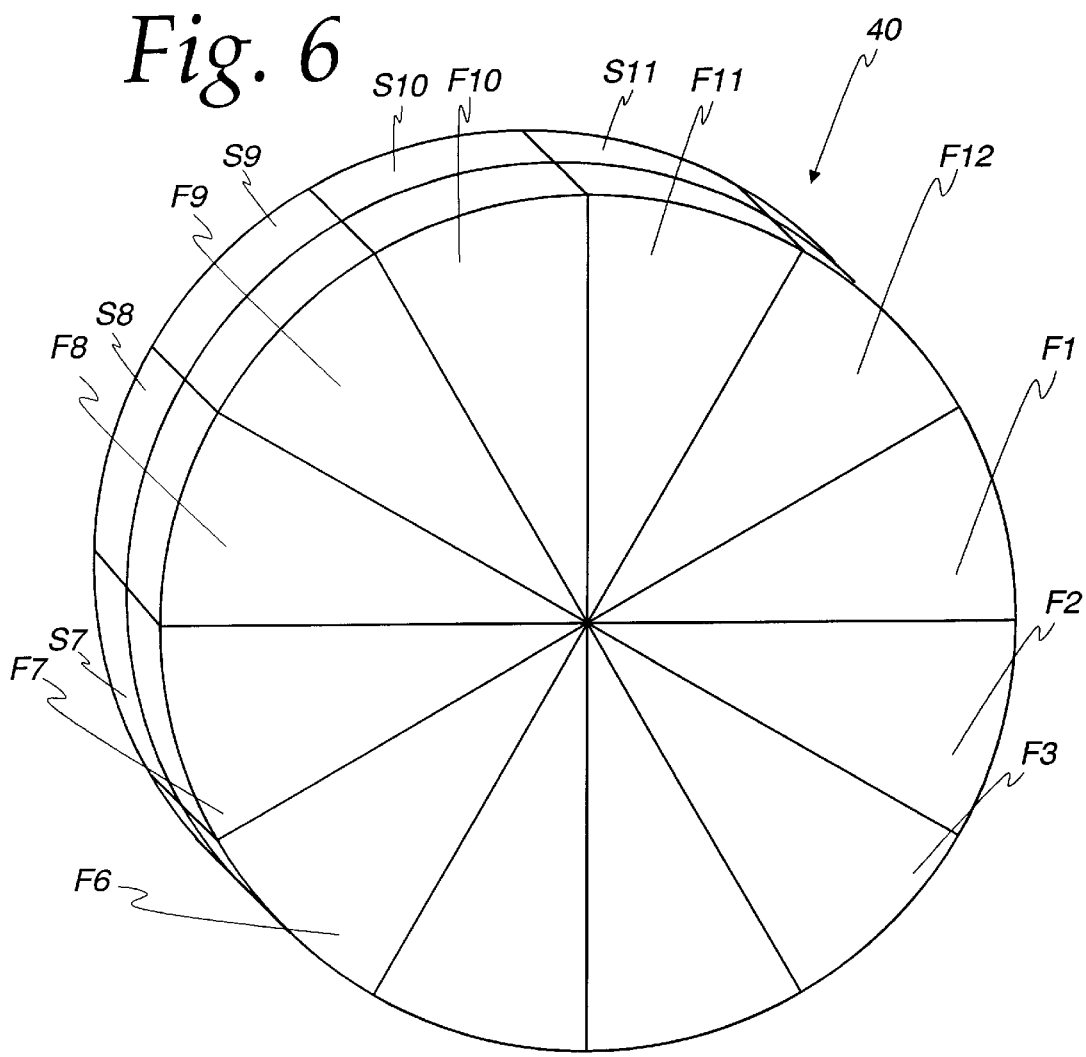
FIG. 6 is a schematic perspective view of the attenuating shutter having a different pattern of the attenuating zones and the shutter segments.

FIG. 6 is a three-dimensional view of another, disc-like embodiment 40 of the attenuating shutter, where the attenuating zones $F_1$ to $F_{12}$ and the corresponding shutter segments $S_1$ to $S_{12}$ are congruent and mutually overlapping. It will be appreciated that many other configurations of the attenuating shutter, its attenuating zones $F_j$ and the shutter segments $S_j$ may be employed, i.e. that the invention is not limited to the patterns illustrated in the above described drawings.

Figure 7:
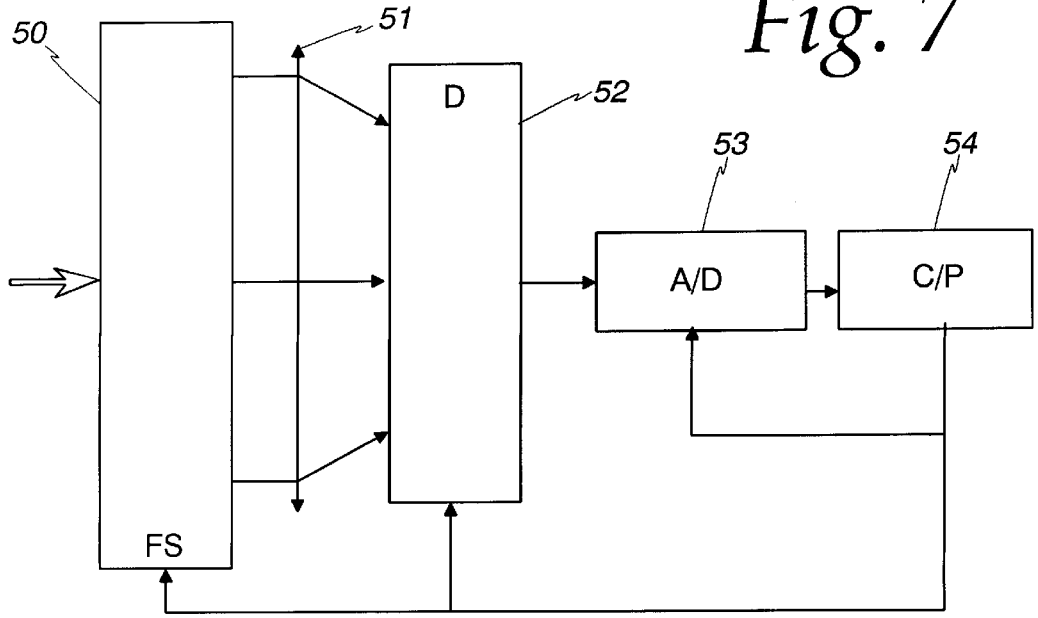
FIG. 7 is a schematic block diagram of a spectrometer comprising the attenuating shutter according to the invention.

FIG. 7 illustrates a block diagram of a spectrometer 45 comprising an attenuating optical shutter designated generally as 50 according to any one of the above-described embodiments. The attenuating shutter 50 is in optical communication with a regular optical detector 52 via an optional lens 51. The detector is further connected to a computer 54 via an analog-to-digital converter 53. The computer 54 serves both for processing the information received from the converter 53, and for the synchronized control of all the components of the spectrometer.

Figure 8:
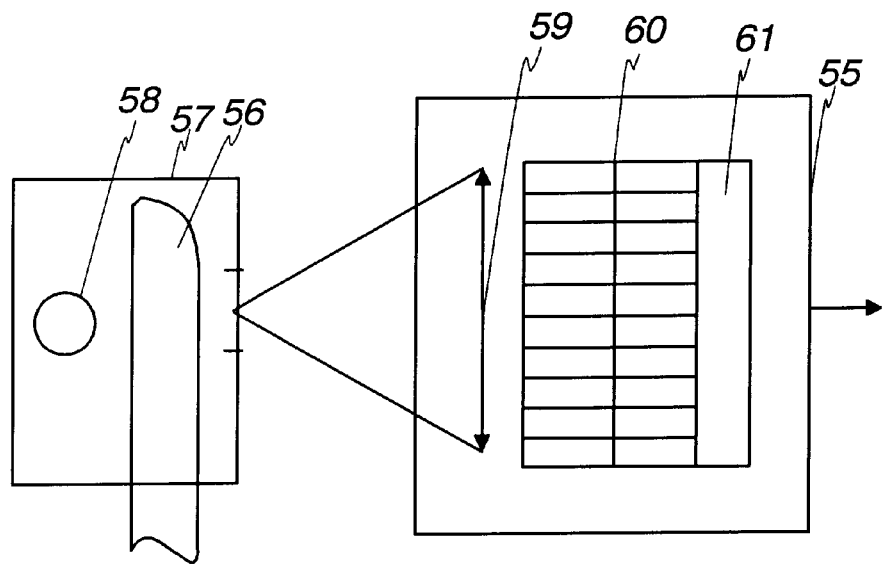
FIG. 8 is a schematic diagram illusing one embodiment of a spectrometer for performing spectral analysis of radiation transmitted through a sample with the aid of the attenuating shutter according to the invention.

FIG. 8 illustrates one possible schematic embodiment 55 of a spectrometer comprising an attenuating shutter 60 according to the invention for performing spectral analysis of a sample 56. In this particular example, the sample 56 is a finger which can be accommodated in a housing 57 of the device between a light source (or a plurality of light sources) 58 and the shutter 60. For example, the light source 58 may comprise one or more light emitting diodes (LED) which illuminate(s) the finger 56 by a radiation band in the range from 920 to 1050 nm. Radiation transmitted through the finger's tissue forms a working optical radiation band which is collected by a collecting lens 59 and directed on to the attenuating shutter 60. Optical segments of the attenuating shutter 60 are controlled in a predetermined manner as will be described below with reference to FIGS. 10 and 11. An outgoing optical signal produced by the attenuating shutter 60 is fed to an optical detector 61. Electrical signals created by the detector 61 in response to the received optical signals are further digitized and processed (not shown). Data obtained by the spectrometer 55 is used for calculating the sought-for spectrum of the sample (in this example—of the blood-perfused tissue of the finger). The obtained spectrum may then be used for determining concentration of a substance, such as glucose or hemoglobin, in the blood.

Figure 9:
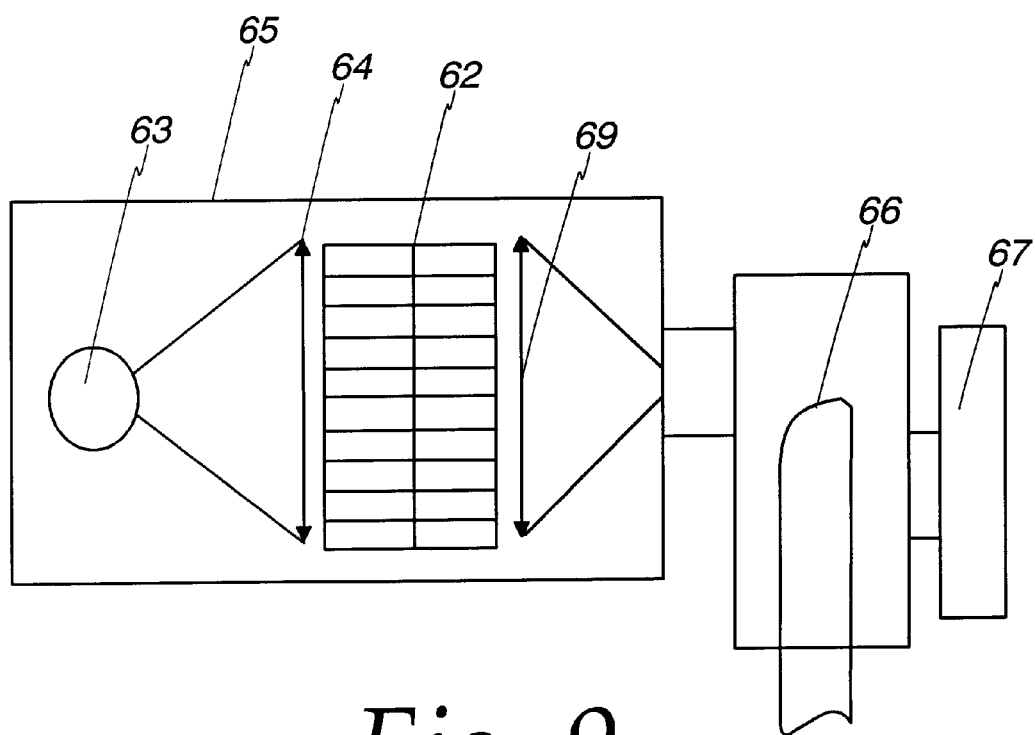
FIG. 9 is a diagram showing another embodiment of a spectrometer with is the inventive attenuating shutter for performing a method of spectral analysis differing from that shown in FIG. 8.

FIG. 9 illustrates schematically another embodiment of the spectrometer generally marked 65 which performs a modified method of spectral analysis of a sample. An attenuating shutter 62 is illuminated by an initial radiation band from a light source 63 via a collecting lens 64. The received initial radiation band is rearranged by the controllably actuated shutter 62 into N wavelength-dependent optical portions, which are collected by a lens 69 and directed on to a sample 66 which is to be placed between the shutter and an optical detector 67. In this drawing the sample is shown as a finger of an individual. Radiation which has been tranmitted through the finger is acquired by the optical detector 67 and converted into electrical signals, which are further processed. Though the embodiment depicted in this particular figure has larger outer dimensions than that of FIG. 8, it provides a better focusing ability, a higher light homogeneity in the shutter and a higher stability of the optical portions produced by the attenuating shutter.

It should be mentioned that, in the examples of both FIG. 8 and FIG. 9, the detectors 61 and 67 may be arranged so as to perceive radiation that is reflected by the sample, and not the radiation transmitted therethrough. In such a case computing means should be provided with an appropriate data base and equations for calculating the sought-for spectral function based on the reflectance measurements.

Figure 10:
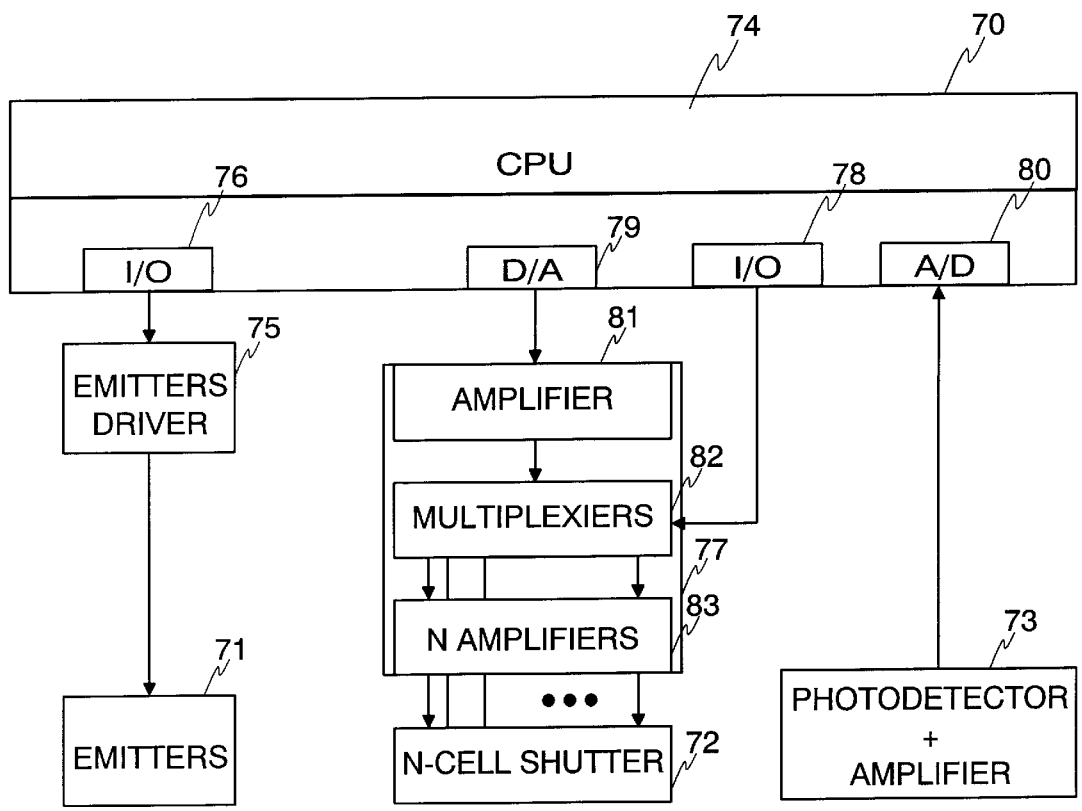
FIG. 10 illustrates a block diagram of a spectrometer where N cells of the attenuating shutter are switched on and off in a successive manner.

FIG. 10 shows schematically a spectrometer 70 comprising a light source 71 having a plurality of light emitters each irradiating at a specific wavelength, an attenuating shutter 72 with N cells (a cell being an optical segment and attenuating zone), and an optical detector coupled to an amplifier and generally marked 73, which are all connected to a central processing unit (CPU) 74. The CPU 74 stores the initial data in a CPU memory (not shown) and performs both the control of the mentioned components of the spectrometers and the processing of measurements received from the detector.

The light source 71 is operated by a driver 75 coupled to the CPU 74 via an input-output port 76. The optical detector 73 is coupled to the CPU 74 via an analog-to-digital port 80. Cells of the attenuating shutter 72 (more exactly, the optical segments thereof) are controlled by an actuator unit 77 which is activated by the CPU 74 through an input-output port 78 and a digital-to-analog port 79. The actuator unit 77 comprises an amplifier 81 linked to a multiplexer 82 which, in tun, is connected to an assembly 83 of N amplifiers.

The spectrometer 70 is controlled in the following way. CPU causes the port 79 to produce an analogous electric signal (for example, in the form of a voltage pulse) which is amplified by the amplifier 81 and fed to the multiplexer 82. According to a control signal received from the port 78 the multiplexer addresses the amplified voltage pulse to a particular amplifier selected from N amplifiers of the assembly 83, and therefrom—to a specific cell of the attenuating shutter 72. Upon receiving the amplified signal, this selected optical segment will open (i.e. become tansparent) while the other segments will remain closed. At this particular moment one, measurement is taken, i.e. the optical signal received by the detector 73 from the shutter 72 will be amplified, converted by the A/D port 80 and stored in the memory of CPU 74. The following voltage signal from the port 79 will lead to switching off the selected cell, and the next signal will activate another cell of the attenuating shutter 72. The measurement session continues until all N cells of the attenuating shutter are exhausted and N readings are stored in the CPU memory for filter processing.

Figure 11:
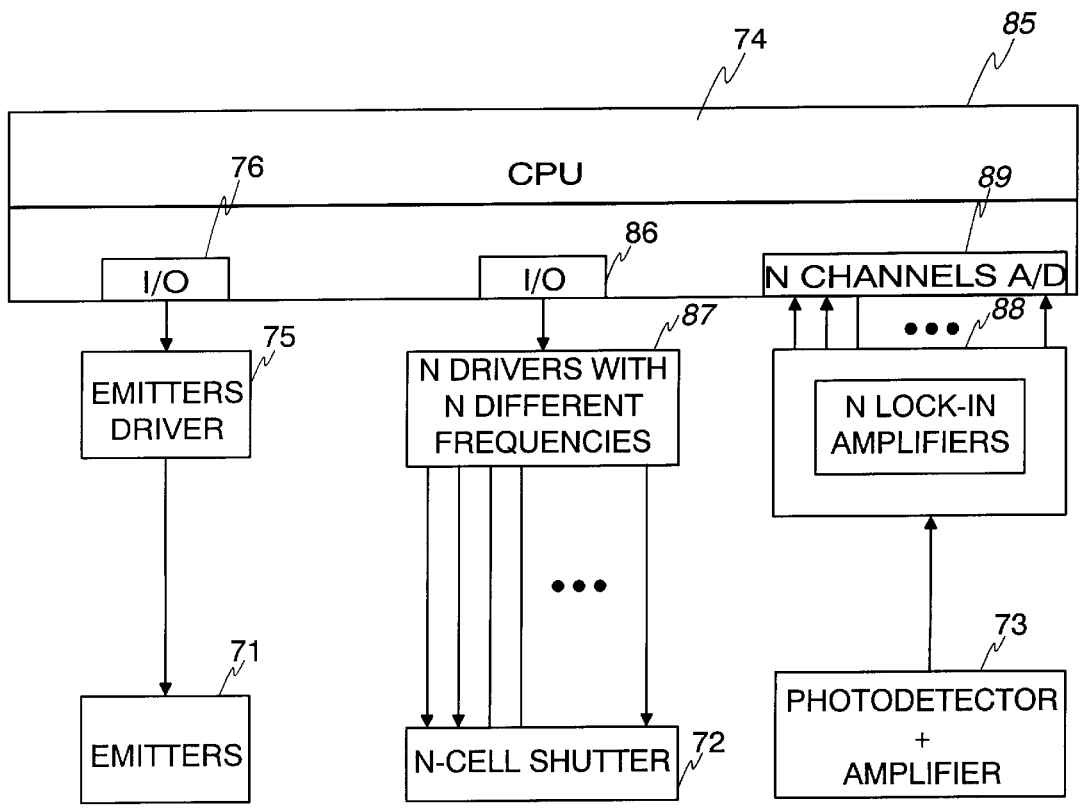
FIG. 11 illustrates a block-diagram of another embodiment of the spectrometer, where each of the N cells of the attenuating shutter is controlled separately at a particular frequency.

FIG. 11 is a block diagram of a spectrometer 85 suitable for illustrating an alternative principle for controlling the attenuating shutter. In FIG. 11 like elements to those of FIG. 10 have been given like reference numerals. The spectrometer composes a light source 71, an attenuating shutter 72 with N cells, an optical detector 73 coupled to an amplifier, and a CPU 74 similar to those shown in FIG. 10. The light source 71 is activated by the emitters' driver 75 controlled from the CPU via the input-output port 76. The attenuating shutter 72 is controlled as follows.

An input-output port 86 of the CPU 74 activates an assembly 87 comprising N drivers operating at different frequencies. Each of the drivers independently controls a certain respective cell of the attenuating shutter 72 causing it to switch on and off at a particular frequency, thus applying a specific frequency modulation to the wavelength-dependent optical portion which is being transmitted through the particular cell. As a result, more than one cell of the shutter 72 may be opened at a specific time. In real time, the optical detector 73 receives from the attenuating shutter 72 all the N differently modulated wavelength-dependent optical portions simultaneously. In order to separate these signals, the detector 73 is coupled to a set 88 comprising N so-called "lock-in" amplifiers which, in turn, are connected to corresponding channels of an N-bit analog-to digital converter (A/D) 89. Each of the lock-in amplifiers selects from the "mixed" signal obtained from the detector only one signal according to its particular pre-selected carrier frequency and, after removing the carrier (i.e. upon demodulation of the signal), transmits the signal to a corresponding channel of the A/D converter 89. According to such a procedure, N separated electrical signals are simultaneously digitized and stored in the CPU memory for further processing. The described embodiment 85 of the spectrometer is advantageous in comparison to that of FIG. 10, since all the N measurements are effected simultaneously, which may be especially important for measurements in vivo. However, from the point of view of hardware such an embodiment is slightly more complex.

As has been outlined in the summary of the invention, the spectral function of an optical band (or of an object) under investigation may be restored either point-by-point (using the described equations (1)), or by applying a particular mathematical approximation to the N measurements of light intensity obtained, according to the method.

One of the efficient ways of mathematically reconstructing the spectral function of a biological object will now be described.

The following legend, assumptions and definitions will be used herein below.

$I_j$ is intensity of light detected at the outlet of the attenuating shutter when only the $j^{th}$ optical segment thereof is open;

$I_{j0}$ is intensity of light detected at the outlet of the attenuating shutter when all the optical segments thereof are closed;

It is assumed that the following requirements are satisfied:

there is a linear dependence between the measured energy and the light intensity, including the case when the whole attenuating shutter is closed;

the light passing through any optical segment of the shutter passes completely through the corresponding attenuating zone of the filter and is completely sensed by the detector;

there are no additional light sources except for a defined source;

the spectrum of the defined source is within the following wavelength interval: $\lambda_{min} < \lambda < \lambda_{max}$ in the above interval all segments of the optical shutter are neutral, i.e. react identically to any wavelength.

Based on the above assumptions, two equations (2) and (3) may be presented:

$$\Delta I_j = k_j^* (I_j - I_{j0}), \tag{2}$$

where:

(j=1 ... N), N—number of cells of the attenuating shutter;

$k_j$ is a correction factor taking into account non-homogeneity of optical segments of the optical shutter, and $\Delta I_j$ is intensity of the $j^{th}$ optical portion detected by the detector, in other words—intensity allowed by the $j^{th}$ attenuating zone.

The measurement $\Delta I_j$ may be represented by an integral equation (3):

$$\Delta I_j = \int_{\lambda_{min}}^{\lambda_{max}} J(\lambda)\varphi_j(\lambda)A(\lambda)d\lambda \tag{3}$$

wherein:

$J(\lambda)$ is a source spectrum which must be known;

$\phi_j(\lambda)$ is the transmitting spectrum of the $J^{th}$ attenuating zone which must be known or obtained by calibration;

$A(\lambda)$ is the sample's spectrum (i.e. its spectral intensity function) which is to be reconstructed.

The calibration may be accomplished by providing measurements, as described above for a sample with a known spectral intensity function (for example, for air). Knowing that $A(\lambda)_{air}=1$, and having effected measurements of $\Delta I_{j(air)}$ for each cell of the attenuating shutter, the equation (3) may be rewritten as equation (4), as follows:

$$\Delta I_{j(air)} = \int_{\lambda_{min}}^{\lambda_{max}} J(\lambda)\varphi_j(\lambda)d\lambda \qquad (4)$$

The unknown of the above equation is the function $\phi_j(\lambda)$ representing the tansmitting spectrum of the $j^{th}$ cell of the attenuating shutter and which can thus be readily obtained.

After having received and stored the calibration results, the attenuating shutter can be utilized for measurements of the spectral function of a real sample. According to equations (1) or (3), the measements will result in obtaining M values of the light intensity received from the real sample for each of the M wavelengths of interest As has been explained above, the fail spectral intensity function of the sample can be restored by applying a method of mathematical approximation using the above-mentioned M obtained measurements of light intensity. A is method of polynomial approximation is one of the effective ways for reconstructing so called "smooth" spectral intensity functions that are widespread in the class of biological objects.

Let us present the sought-for function $A(\lambda)$ as a polynomial having power P<N. Let "k" be a running number of a polynomial member. The function can be written down in the form of equation (5), as follows:

$$A(\lambda) = \sum_{k=0}^{P-1} x_k L_k(\lambda) \qquad (5)$$

where:

$L_k(\lambda)$ is a LaGrange polynomial of the power k on the interval ,($\lambda_{min}, \lambda_{max}$);

$x_k$ are unknown parameters of expansion of the spectral function of the sample, in terms of the LaGrange polynomials.

For defining the sought-for function $A(\lambda)$ the unknown parameters $x_k$ are to be found. These parameters can be determined by minimizing the measurement deviation (MD) using a so-called method of "minimal squares" (Equation (6)):

$$MD = \sum_{j=1}^{N} (\Delta I_j - i_j)^2 \qquad (6)$$

where:

$\Delta I_j$—(already defined) is a measured value of intensity of the light passed through the $j^{th}$ cell of the attenuating shutter, $\Delta I_j$ is represented by the above-mentioned equation (3);

$i_j$—is an approximated value of intensity of the light passed through the $j^{th}$ cell of the attenuating shutter.

In other words, such $i_j$ are selected, which cause MD to be minimal

In the approximation procedure, $A(\lambda)$ in the equation (3) is replaced by equation (5), thereupon the equation (3) acquires the following form (7):

$$i_j = \sum_{k=1}^{P-1} a_{jk} x_k \qquad (7)$$

where:

P is the number of parameters $x_k$ which must be not more than the number of cells in the attenuating shutter, i.e. NP, and $\alpha_{jk}$ is a construction matrix depending on the type of approximation, which in our case looks as shown in formula (8) below.

$$a_{jk} = \int_{\lambda_{min}}^{\lambda_{max}} J(\lambda)\varphi_j(\lambda)L_k(\lambda)d\lambda \qquad (8)$$

Readings of $\alpha_{jk}$ can be obtained from equation (8) and substituted to the equation (7). It can be seen from equation (7) that approximation $i_j$ is a linear function of unknown parameters $x_k$, thus they can be defined by applying any procedure for minimization of total measurement deviation.

After obtaining values of the parameters $x_k$ one can restore the complete spectral function $A(\lambda)$ using the equation (5).

What is claimed is:

1. An attenuating optical shutter suitable for high speed spectral analysis of a band of optical radiation outgoing from a turbid medium, and capable of deriving N wavelength-dependent portions of said optical radiation band, said attenuating optical shutter being in the shape of a two-dimensional array and incorporating:

an optical shutter body including N segments, each selectively switchable between a first substantially transparent and a second substantially opaque optical state, and a multi-zone attenuator comprising N optical wide band attenuating zones each having a different predetermined wavelength-dependent attenuation characteristic, wherein each of the shutter segments is optically interconnected with a respective one of the N optical attenuating zones of the multi-zone attenuator, thus forming N respective cells of the attenuating optical shutter.

2. The attenuating shutter according to claim 1, wherein said N segments of the optical shutter are capable of being successively actuated, so that at any given moment, only one of the N segments is in its first state.

3. The attenuating shutter according to claim 1, wherein each of said N segments of the optical shutter is capable of being switched from the first to the second state and vice versa at a pre-selected frequency.

4. The attenuating shutter according to claim 1, wherein respective ones of the N shutter segments and of the N optical attenuating zones have identical geometrical shapes and are mutually aligned.

5. The attenuating shutter according to claim 4, wherein said optical shutter body is affixed to said multi-zone attenuator.

6. The attenuating shutter according to claim 5, wherein the optical shutter body and the multi-zone attenuator are glued one to the other.

7. The attenuating shutter according to claim 1, wherein mutual positions of the optical shutter body and the multi-zone attenuator are such that each of the N segments of the optical shutter body lies on one and the same optical path with the corresponding optical attenuation zone of the multi-zone attenuator, while being spaced therefrom.

8. The attenuating shutter according to claim 1, wherein each of the N segments of the optical shutter body is interconnected to a respective one of the N optical attenuation zones of the multi-zone attenuator by means of at least one optical fiber.

9. The attenuating shutter according to claim 1, wherein the multi-zone attenuator precedes the optical shutter with respect to a direction of an optical beam.

10. The attenuating shutter according to claim 1, wherein the multi-zone attenuator follows the optical shutter with respect to the direction of an optical beam.

11. The attenuating shutter according to claim 1, wherein the optical shutter is integrally combined with the multi-zone attenuator, the N segments being selectably switchable between-the first and the second optical states so as to serve as N respective optical attenuating zones each having a different predetermined wavelength-dependent attenuation characteristic.

12. The attenuating shutter according to claim 1, wherein the optical shutter body is manufactured from a ferroelectric liquid crystal.

13. The attenuating shutter according to claim 1, specifically designed for spectral analysis of biological objects.

14. The attenuating shutter according to claim 13, comprising attenuating zones active in a near infrared range.

15. A spectrometer for spectral analysis of turbid media, said spectrometer comprising the attenuating shutter according to claim 1.

16. The spectrometer according to claim 15, comprising:
an optical detector for receiving said optical radiation and producing an analog signal,
an analog-to-digital (A/D) converter coupled to an output of the optical detector for converting the analog signal to equivalent digital signals,
a computing unit coupled to the A/D converter for processing the digital signals so as to derive spectral data; and
a controller for controlling activation of said attenuating shutter and for controlling other components of the spectrometer.

17. The spectrometer according to claim 16, wherein:
said attenuating shutter is controllable such that the N zones of the optical shutter body of the attenuating shutter are activated successively, so that at any given moment only one zone is in the first state;
the optical detector is controlled synchronously for successively detecting light intensities of the N wavelength-dependent portions of the optical radiation emanating from the attenuating shutter; and
the A/D converter is adapted for synchronously receiving the analog signals from the optical detector.

18. The spectrometer according to claim 16, wherein:
said optical shutter body of the attenuating shutter is controllable so as to activate each of the N optical zones thereof at a pre-selected carrier frequency, thus applying pre-selected frequency modulation to the optical radiation portion passing through a particular cell of the shutter, thereby allowing for simultaneous passage of the N optical portions through the attenuating shutter in real time; and
the optical detector is linked to an electronic circuit for separating the detected integral signal into N constituent signals according to said N carrier frequencies for further demodulating and digitizing of said constituent signals.

19. The spectrometer according to claim 16, wherein said optical detector follows the attenuating shutter along a direction of the optical radiation.

20. The spectrometer according to claim 19, wherein said detector is directly coupled to said attenuating shutter.

21. The spectrometer according to claim 16, wherein the medium to be investigated is insertable between said attenuating shutter and said optical detector.

22. The spectrometer according to claim 15, additionally equipped with a light source.

23. The spectrometer according to claim 15, specifically designed for performing spectral analysis of biological objects.

24. A method of determining a spectral function of a turbid medium sample, comprising the following steps:
(a) providing the attenuating shutter according to claim 1, with N cells and having preliminarily defined wavelength-dependent attenuation characteristics for each of N zones of the multi-zone attenuator;
(b) illuminating said attenuating shutter with an optical radiation band having a known optical composition;
(c) actuating said attenuating shutter controllably for obtaining N wavelength-dependent portions of said optical radiation band;
(d) illuminating said sample with said N wavelength-dependent portions of said optical radiation band;
(e) providing N measurements of intensity of N respective optic portions acquired from the sample; and
(f) calculating the spectral function of said sample based on the obtained N measurements of intensity and the preliminarily defined wavelength-dependent attenuation characteristics.

25. The method according to claim 24, wherein said predetermined wavelength-dependent characteristics for each of, N attenuating zones of the attenuating shutter is comprised of a plurality of specific attenuation ratios actual for a selected plurality of wavelengths characteristic for the spectrum, respectively.

26. The method according to claim 24, further comprising an additional step of preliminary calibration for determining said wavelength dependent characteristics for each of the N cells; the calibration being effected by illuminating the attenuating shutter with a known spectrum of optical radiation through a medium having known optical properties.

27. The method according to claim 24, wherein the spectral function is determined in respect of M wavelengths;
the wavelength-dependent attenuation characteristics of each particular cell of the attenuating shutter comprises M preliminarily defined wavelength-dependent attenuation ratios each in respect of a corresponding zone of the multi-zone attenuator, whereby M*N of said ratios are preliminarily defined; and
the spectral function of said optical radiation band is calculated based on the obtained N measurements of intensity and the preliminarily defined M*N wavelength-dependent attenuation ratios where M is not greater than N.

28. The method according to claim 27, wherein the spectral function substantially conforms to the following system of equations $$\Delta I_1 = \sum_{i=1}^{M} A_i \varphi_1(\lambda_i)$$

$$\Delta I_j = \sum_{i=1}^{M} A_i \varphi_j(\lambda_i)$$

$$\Delta I_N = \sum_{i=1}^{M} A_i \varphi_N(\lambda_i)$$

where:
N—the number of attenuation zones in the attenuating shutter, which may be obtained therefrom;

j—a running number of an attenuating zone in the shutter, ($1 \leq j \leq N$);

M—the quantity of spectral lines which is chosen for spectral analysis, $M \leq N$;

i—a running number of a spectral line ($1 \leq i \leq M$);

$\lambda_i$—a wavelength corresponding to a specific spectral line i;

$\Delta I_j$—intensity of one specific wavelength-dependent optic portion detected by the detector and registered in the computer;

$A_i$—intensity of a specific spectral line;

$\phi_j(\lambda_i)$—an attenuation ratio of the attenuation zone j in the attenuation shutter regarding the wavelength $\lambda_i$.

29. The method according to claim 24 for determining the spectral function along the full wavelength spectrum of the optical radiation band under examination, wherein calculation of the spectral function is accomplished by means of mathematical approximation thereof, applying a procedure of error minimization and further restoring the spectral function.

30. The method according to claim 29, wherein the approximation of the spectral function and the error minimization procedure are a polynomial approximation and Gauss' procedure, respectively.

31. The method according to claim 30, wherein said spectral function is the spectral function of a biological object.

32. The method according to claim 24, intended for determining concentration of a predetermined substance in the sample and comprising illuminating the sample or the attenuating shutter by said electromagnetic radiation band having wavelength composition initially restricted to wavelengths being characteristic of the spectral function of said substance.

33. The method according to claim 32, intended for determining the hemoglobin or glucose concentration in blood, wherein the restricted radiation is in the near infrared range.

* * * * *